United States Patent [19]

Yau

[11] Patent Number: 5,043,015
[45] Date of Patent: Aug. 27, 1991

[54] TITANIUM DIOXIDE DISPERSIONS INCLUDING DENATURANT

[75] Inventor: Chiou C. Yau, Wrentham, Mass.

[73] Assignee: The Gillette Company, Boston, Mass.

[21] Appl. No.: 447,358

[22] Filed: Dec. 7, 1989

[51] Int. Cl.$^5$ .............................................. C04B 14/00
[52] U.S. Cl. ..................................... 106/436; 106/311
[58] Field of Search ................................ 106/436, 311

[56] References Cited

U.S. PATENT DOCUMENTS 4,179,306 12/1979 Woditsch ............................ 106/436
4,280,849 7/1981 Howard et al. ...................... 106/436
4,288,254 9/1981 Gladu ................................... 106/436

Primary Examiner—William R. Dixon, Jr.
Assistant Examiner—Willie J. Thompson
Attorney, Agent, or Firm—John P. Morley

[57] ABSTRACT

Dispersions of titanium dioxide pigment(s) in volatile organic solvent systems. The dispersions include a denaturant to discourage inhalation of vaporous constituents of the solvent system and a deactivator to reduce or control interaction between the titanium dioxide pigment and the denaturant.

10 Claims, No Drawings

TITANIUM DIOXIDE DISPERSIONS INCLUDING DENATURANT

BACKGROUND OF THE INVENTION

1. Field of the Invention

This invention relates to compositions including titanium dioxide pigments dispersed in volatile, organic solvent systems. More particularly, the invention relates to dispersions of titanium dioxide pigments in volatile organic solvent systems which include a denaturant which can discourage inhalation of vaporous constituents of the solvent system.

2. Description of the Prior Art

Dispersions of titanium dioxide in volatile organic solvent systems are known products of commerce, and such dispersions have been used in commercial paints, correction fluids, and inks and the like. The organic solvent systems of such dispersions usually include vaporous constituents which can effect or depress the central nervous system (CNS) if inhaled at high concentration levels. Unfortunately, commercial products including vaporous constituents which can affect the CNS have been the subject of a serious ongoing abuse commonly knows as "sniffing". The abuse involves deliberately concentrating the vaporous constituents and inhaling the concentrated vapors and oftentimes results in death. This invention relates to dispersions of titanium dioxide pigments in organic solvent systems and provides dispersions including denaturants to discourage inhalation (or sniffing) of concentrated vaporous constituents of the solvent system.

SUMMARY OF THE INVENTION

The present invention provides novel, improved dispersions of titanium dioxide pigments in volatile organic solvent systems. Essential components of the dispersions are a surface-treated titanium dioxide pigment, a deactivator, an isothiocyanate denaturant, and an organic solvent system including volatile constituents. Surface-treated titanium dioxide pigments included in dispersions of the present invention have surface sites which can interact with the isothiocyanate denaturant. Isothiocyanate denaturants included in dispersions of the present invention are malodorous or have the capability to function as an effective lacrimator, or sternutator or tussive or nauseant to thereby discourage inhalation of solvent system components. In accordance with the present invention, acid halide deactivators are added to the dispersions to reduce or control interaction between the surface-treated titanium dioxide and the isothiocyanate denaturant.

DETAILED DESCRIPTION OF THE INVENTION

Titanium dioxide pigments useful in the novel dispersions of the present invention are commercially available titanium dioxides which have been surface treated to improve the dispersability of the pigment and properties such as gloss, brightness, opacity, and tinting strength. The surface treatment normally involves coating agents including aluminum oxide oftentimes combined with silicon dioxide, and the coating agents are usually applied to the titanium dioxide surface by wet slurry techniques. Preferred surface-treated titanium dioxide pigments of the present invention have an average particle size (or diameter) between about 0.20 to about 0.40 micrometers and a surface area between about 10 to about 50 square meters per gram ($m^2/g$). Normally, dispersions of the present invention include from about 10 to about 70 percent by weight of surface-treated titanium dioxide.

The isothiocyanates included in dispersions of the present inventions are designed to function as denaturants to discourage inhalation of vaporous constituents of the solvent system. Accordingly, suitable isothiocyanates are highly malodorous or can function as a lacrimator (eye irritant) or as a sternutator (an irritant causing sneezing) or as a tussive (an irritant causing coughing) or as an nauseant (an irritant causing nausea) when inhaled. Preferred isothiocyanates are allylisothiocyanates, phenylisothiocyanates and lower alkylisothiocyanates such as propylisothiocyanate. Allylisothiocyanate (mustard oil) is the especially preferred isothiocyanate in the practice of the invention. The amount of preferred isothiocyanate(s) normally included in dispersions of the present invention may be between about 0.05 to about 1.0 percent by weight of the dispersion or somewhat higher.

In accordance with the practice of the invention, it has been found that there is an interaction between commercially available surface-treated titanium dioxide pigments and isothiocyanates when they are dispersed in volatile organic solvent systems. The interaction results in a progressive reduction in the concentration of the isothiocyanate, probably through decomposition of the isothiocyanate. The reduction in concentration will vary depending upon the particular surface-treated titanium dioxide involved and wide variation in the degree of interaction are found in surface-treated titanium dioxides of different manufacturers and in different lots of the same surface treated titanium dioxide pigment product. For example, in a series of simple screening tests involving dispersions of surface-treated titanium dioxides and an allylisothiocyanate. The original concentration of allylisothiocyanate in the dispersions was reduced by at least about 40 percent after 20 days of storage at 50° C. However, in some dispersions, the concentration of allylisothiocyanate was reduced by 90 percent or more. A series of tests was also conducted to determine the cause of the interaction between the surface-treated titanium dioxide and the isothiocyanate. These tests establish that the interaction between a surface-treated titanium dioxide and isothiocyanate is confined to titanium dioxide pigments which have been treated with aluminum oxide. Accordingly, it is presently believed that the surface treatment of titanium dioxide pigments with aluminum oxide generates sites on the pigment surface which interact with isothiocyanates, and the interaction can diminish the effective concentration of isothiocyanate(s) available as a denaturant.

The novel, distinctive feature of titanium dioxide pigment dispersions of the present invention involves the addition of specific selected deactivators to control interaction of pigment surface sites with the isothiocyanate. Many materials can be added to the dispersions to reduce the degree of the interaction between the pigment surface sites and the isothiocyanate. For example, the addition of castor oils, alcohols, lower alkylene glycols, alkyl citrates and alkyl lactates to the dispersions can provide a degree of control over the interaction between the titanium dioxide pigment and isothiocyanates, particularly if other ingredients such as thickeners or film forming materials are not involved. However, in accordance with the present invention, I have found that acid halides are especially reliable and effective deactivators which can be used at low concentrations (below about 2.0 percent by weight) to consistently control interaction between isothiocyanates and titanium dioxide surface sites.

The selection of a suitable acid halide deactivator and the amount thereof to control interaction between a surface treated titanium dioxide pigment and the isothiocyanate denaturant is determined emperically. Essentially, the determination involves preparing a series of dispersions in which each dispersion includes the same amount of the same surface treated titanium dioxide pigment, isothiocyanate and organic solvent system. Different measured concentration of a selected acid halide deactivator are then added to each dispersion, and the dispersions are stored in closed containers at 50° C. for at least twenty days. Preferably, the different concentrations of deactivator added to the dispersions range between about 0.05 to about 2.0-3.0 percent deactivator by weight based on the total weight of the dispersion, and usually, the deactivator is not added to at least one dispersion in the series to provide a control. After twenty days storage at 50° C., the amounts of isothiocyanate remaining in the dispersions are measured by standard gas chromatographic techniques using a moderately polor stationary phase and a thermal conductivity detector to compare the signal from the measured amount of isothiocyanate remaining in the dispersion to the signal of a known concentration of the isothiocyanate. The percent isothiocyanate remaining in the dispersions is then calculated as follows:

$$\text{Percent Isothiocyanate Remaining } (PIR) = \frac{\text{Measured Amount of Isothiocyanate}}{\text{Initial Amount of Isothiocyanate}} \times 100$$

For the purposes of the present invention, useful acid halide deactivators are aliphatic or aromatic acid halides which provide dispersions in which the Percent Isothiocyanate Remaining (PIR) after twenty days storage at 50° C. is 65 percent or higher. It has been found that the PIR value in a dispersion stored for twenty days at 50° C. closely corresponds to the PIR value found for the same dispersion which is stored for one year at room temperature. Particularly preferred acid halides conform to the formula:

where R is alkyl and X is chloride.

The invention as well as manners of practicing it will be more fully appreciated by reference to the following illustrative Example.

Example 1

This example illustrates the effectiveness of stearoyl chloride and butyryl chloride as deactivators in controlling interaction between surface-treated titanium dioxide pigments and allylisothiocyanate.

The following dispersions were prepared by adding the ingredients to a glass container, capping the container, and shaking by hand for two minutes.

|  | (Percent By Weight) | | | |
| --- | --- | --- | --- | --- |
|  | Control | 1 A | 2 A | 3 A |
| titanium dioxide[1] | 43.6 | 43.5 | 43.5 | 43.5 |
| Allylisothiocyanate | 0.4 | 0.4 | 0.4 | 0.4 |
| steroyl chloride | — | 1.2 | — | — |
| butyryl chloride | — | — | 0.6 | 1.0 |
| 1,1,1-Trichloroethane | 56.0 | 54.9 | 55.5 | 55.1 |

[1] The titanium dioxide was a surface-treated titanium dioxide sold under the tradename TI PURE R-901 by E. I. DuPont de Nemours & Company. The titanium dioxide used in each dispersion was from the same sample lot.

The following summarizes the PIR (percent allylisothiocyanate remaining) after storage of the dispersions in closed containers at 50° for twenty days:

| Dispersion | PIR |
| --- | --- |
| Control | 2 |
| 1 A | 66 |
| 2 A | 66 |
| 3 A | 67 |

From the foregoing description, it will be apparent that selected acid halide deactivators can effectively control the interaction between surface-treated titanium dioxide pigments and isothiocyanate denaturants. However, it should be remembered and clearly understood that the extent of interaction between the pigment and denaturant can vary between different titanium dioxide pigment products and between lots of the same titanium dioxide pigment product. It should also be clearly understood that the extent of interaction can be affected by the presence of other solvents or of other ingredients of the dispersion such as polymeric film forming materials, thickeners, additional pigments or other ingredients added for desired properties. Accordingly, the determination of the effective concentrations of a selected acid halide deactivator must be based on emperical tests in which the selected deactivator is added to the complete composition of the titanium dioxide pigment dispersion involved to determine those concentrations of deactivator which will provide a Percent Isothiocyanate Remaining (PIR) value of 65 percent or higher after storage of the composition and deactivator at 50° C. for at least twenty days.

What is claimed is:

1. A composition comprising a surface-treated titanium dioxide pigment, an isothiocyanate and an acid halide deactivator dispersed in a volatile organic solvent system, said deactivator being present in an amount effective to control interaction of the isothiocyanate with said pigment to the extent that the percent isothiocyanate remaining in the composition after the composition is stored for at least twenty days at about 50° C. is about 65 percent or higher.

2. A composition of claim 1 where the isothiocyanate is selected from the group consisting of an allylisothiocyanate, a phenylisothiocyanate, an alkylisothiocyanate and mixtures of these.

3. A composition of claim 1 where the titanium dioxide has a surface area between about 10 to about 50 m²/g.

4. A composition of claim 1 where the average particle size of the titanium dioxide is between about 0.20 to about 0.40 micrometer.

5. A composition of claim 1 where the concentration of titanium dioxide pigment is between about 10 to about 70 percent by weight of the dispersion.

6. A composition of claim 2 where the isothiocyanate is an allylisothiocyanate.

7. A composition of claim 6 where the deactivator is an acid chloride.

8. A composition of claim 7 where the deactivator is selected from the group consisting of butyryl chloride, stearoyl choride or mixtures of these.

9. A composition of claim 8 where the titanium dioxide has an average particle size between about 0.20 to about 0.40 micrometer and a surface area between about 10 to about 35 $m^2/g$.

10. A composition of claim 9 where the concentration of titanium dioxide is between about 20 to about 60 percent by weight of the dispersion.

* * * * *